US006826365B1

(12) United States Patent
Constable

(10) Patent No.: US 6,826,365 B1
(45) Date of Patent: Nov. 30, 2004

(54) BATTERY SAVING FLASH CHARGER CONTROL

(75) Inventor: Douglas W. Constable, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 10/679,803

(22) Filed: Oct. 6, 2003

(51) Int. Cl.⁷ .............................................. G03B 15/05
(52) U.S. Cl. ....................................................... 396/206
(58) Field of Search ............................... 396/205, 206; 315/241 P

(56) References Cited

U.S. PATENT DOCUMENTS

| | | | |
|---|---|---|---|
| 4,130,780 A | 12/1978 | Ban et al. | 315/241 P |
| 4,323,822 A | 4/1982 | Takematsu | 315/241 P |
| 4,361,389 A | 11/1982 | Monks et al. | 396/206 |
| 4,441,774 A | 4/1984 | Kazami et al. | 315/241 P |
| 4,479,076 A | 10/1984 | Yamaoka et al. | 315/241 P |
| 4,509,844 A | 4/1985 | Takematsu | 396/206 |
| 4,511,233 A | 4/1985 | Kazami et al. | 396/206 |
| 4,522,479 A | 6/1985 | Yamada et al. | 396/201 |
| 4,610,521 A | 9/1986 | Inoue | 396/206 |
| 4,737,806 A | 4/1988 | Sakaguchi et al. | 396/206 |
| 5,016,038 A | 5/1991 | Kobayashi et al. | 396/206 |
| 5,034,662 A | 7/1991 | Nishida et al. | 315/241 P |
| 5,045,876 A | 9/1991 | Aihara | 396/206 |
| 5,574,337 A | 11/1996 | Dunsmore | 315/241 P |
| 5,781,804 A | 7/1998 | Constable | 396/6 |
| RE36,239 E | 6/1999 | Kobayashi et al. | 396/206 |
| 5,974,267 A | 10/1999 | Motomura | 396/6 |
| 6,150,770 A * | 11/2000 | Hirata et al. | 315/241 P |
| 6,249,648 B1 * | 6/2001 | Constable | 396/206 |
| 6,345,151 B1 * | 2/2002 | Hata | 396/6 |

* cited by examiner

Primary Examiner—W. B. Perkey
(74) Attorney, Agent, or Firm—Roland R. Schindler, II

(57) ABSTRACT

A flash circuit for use in a camera, the flash charging circuit comprising a flash light discharge circuit having a light emitting element electrically connected to a flash capacitor; a flash triggering circuit connected to the flash light discharge circuit with the flash triggering circuit having a trigger signal generating circuit generating a signal that enables energy from the energy storage device to be converted into light by the light emitting element; a voltage conversion circuit connected between a battery and the flash capacitor to convert energy from a source voltage into a higher voltage to charge the flash capacitor; a timer circuit to cause the voltage conversion circuit to operate when the voltage at a timing capacitor is within a range of voltages, said timer circuit having a time constant circuit connected to the timing capacitor to discharge energy stored in the timing capacitor at a predetermined rate; a reset circuit that resets the timing capacitor voltage to a voltage that is within the range.

19 Claims, 4 Drawing Sheets

BATTERY SAVING FLASH CHARGER CONTROL

FIELD OF THE INVENTION

The present invention relates to a photographic flash circuit, and, more particularly to a flash circuit having a voltage boosting circuit for charging a photoflash capacitor.

BACKGROUND OF THE INVENTION

It is well known to use electronic flash circuits to provide artificial illumination of a scene to improve the appearance of a photographic image. Because cameras are typically portable many electronic flash circuits draw energy from portable batteries such as chemical batteries. Charging circuits are used to convert battery voltage into a higher voltage that can charge a flash capacitor so that it stores sufficient energy to cause a flash tube to discharge enough light to illuminate the scene. Chemical batteries provide a fixed amount of power to such flash circuits and, therefore, needless operation of the flash charging circuit is to be avoided to prevent premature exhaustion of the chemical batteries during a photography session.

U.S. Pat No. 4,522,479 entitled "Flash Apparatus with Power Supply Control Device" filed in the name of Yamada et al. on Dec. 24, 1983 discloses a power supply control device for use in a flash apparatus. The disclosed power supply control device automatically cuts off power to a flash apparatus by turning off a power switch at a predetermined time after the power switch is turned "on". This prevents the waste of electrical energy that can arise from, for example, the careless failure to turn the power switch off. The power supply control device is provided with a timer circuit that sets the predetermined period of time and is arbitrarily resettable with a manually operable power switch. The circuit of the '479 patent incorporates a number of expensive electrical components, including integrated circuits such as operational amplifiers and a one shot multivibrator. This makes such a circuit expensive. This circuit may be useful for flash circuits of the type that are incorporated in expensive products such as single lens reflex cameras and separable flash units of the type that are typically used with SLR type cameras. What is needed is a less expensive circuit for use in lower cost cameras and one-time use cameras.

SUMMARY OF THE INVENTION

A flash circuit for use in a camera, the flash charging circuit comprising a flash light discharge circuit having a light emitting element electrically connected to a flash capacitor; a flash triggering circuit connected to the flash light discharge circuit with the flash triggering circuit having a trigger signal generating circuit generating a signal that enables energy from the energy storage device to be converted into light by the light emitting element; a voltage conversion circuit connected between a battery and the flash capacitor to convert energy from a source voltage into a higher voltage to charge the flash capacitor; a timer circuit to cause the voltage conversion circuit to operate when the voltage at a timing capacitor is within a range of voltages, said timer circuit incorporating said timing capacitor in a time constant circuit that discharges energy stored in the timing capacitor at a predetermined rate; a reset circuit that resets the timing capacitor voltage to a voltage that is within the range; wherein the range of voltages is higher than the battery voltage and wherein the reset circuit first applies battery voltage to the timing capacitor and then applies voltage generated by the voltage conversion circuit to charge the timing capacitor to a voltage that is higher than the battery voltage.

A flash charging circuit for use in a camera, the flash charging circuit comprising a flash light discharge circuit comprising a light emitting element electrically connected to a flash capacitor; a flash triggering circuit connected to the flash light discharge circuit with the flash triggering circuit having a trigger signal generating circuit generating a signal that enables energy from the flash capacitor to be converted into light by the light emitting element;

a voltage conversion circuit connected between a battery and the flash capacitor to convert energy from a battery voltage into a higher voltage to charge the flash capacitor; a timer circuit to cause the voltage conversion circuit to operate when the voltage at a timing capacitor is within a range of voltages, said timer circuit incorporating the timing capacitor in a time constant circuit that discharges energy stored in the timing capacitor at a predetermined rate; and a reset circuit having a thyristor connected to the timing capacitor, a gate of said thyristor being triggered upon operation of a shutter of the camera, with the thyristor being connected to the battery and conducting energy from the battery to the timing capacitor when the thyristor is triggered to charge the timing capacitor to a voltage no greater than the battery voltage but within the range of voltages; wherein said voltage conversion circuit further supplies voltage pulses to the thyristor to charge the timing capacitor to a voltage higher than the battery voltage when the voltage conversion circuit is operated and wherein the thyristor turns off when the voltage at the timing capacitor approaches the voltage of said pulses.

In yet another aspect of the invention, what is provided is a photographic flash circuit The flash circuit has a light emitting element connected to a flash capacitor, a flash triggering circuit which causes the light emitting element to convert energy from the flash capacitor into light and a voltage conversion circuit for converting a low battery voltage into a higher voltage to charge said flash capacitor, with the voltage conversion circuit having an oscillation transistor and at least one other transistor in an oscillation current path, said oscillation transistor oscillating during voltage conversion. A diode is connected to more than one transistor to suppress any voltage spikes at both transistors that appear during oscillation at the transistors to which the diode is connected.

In still another aspect of the invention a photographic flash charging circuit is provided. The photographic flash circuit comprises a light emitting element connected to a flash capacitor, a flash triggering circuit which causes the light emitting element to convert energy from the energy storage capacitor into light, and a timer control circuit adapted to cause the voltage conversion circuit to operate for a timing period and then automatically shut off, with the timer control being reset to the beginning of the timing period by actuation of the flash triggering circuit, with the timer control circuit having a timing period determined as a function of the voltage to which a timing capacitor is charged when the timer control circuit is reset. Test points are provided across the timing capacitor so that a testing circuit can determine conditions at the timing capacitor during the testing.

DETAILED DESCRIPTION OF THE INVENTION

Figure 1:
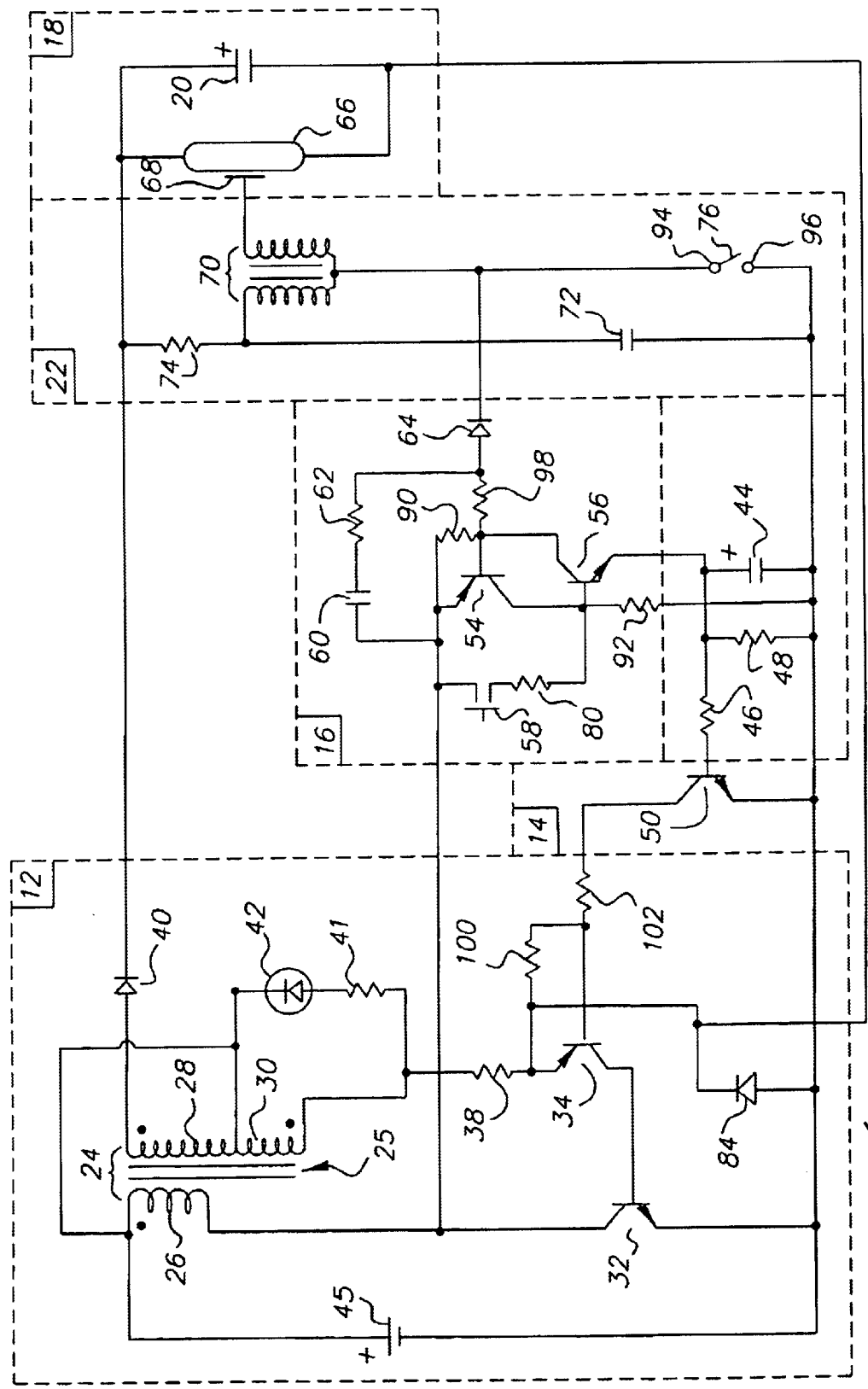
FIG. 1 shows one embodiment of a flash circuit in accordance with the present invention.

FIG. 1 shows one embodiment of a flash circuit 10 in accordance with present invention. Flash circuit 10 is low-cost and therefore is particularly useful in a low-cost one time use camera. Flash circuit 10 comprises a voltage boosting circuit 12, a timer circuit 14, a reset circuit 16, a flash discharge circuit 18, and flash triggering circuit 22.

Voltage boosting circuit 12 comprises an oscillation step-up transformer 24 having a core 25, a primary winding 26 a secondary winding 28, and a feedback winding 30. Voltage boosting circuit 12 also has an oscillation transistor 32, a control switch transistor 34, a feedback current limiting resistor 38, a high-voltage rectifier diode 40, a resistor 41 and a light emitting diode 42. A battery 45 is also provided, and in the embodiment shown in FIG. 1, battery 45 comprises a single 1.5 volt battery. Battery 45 can take any variety of forms, for example, batteries of different size and/or voltage rating can be used as well as combinations of more than one battery.

Timer circuit 14 comprises a timing capacitor 44, time constant resistors 46, 48, and transistor 50.

Reset circuit 16 comprises latch transistors 54 and 56, connected to latch each other on, momentary contact switch 58, holding capacitor 60 and series resistor 62 and flash sync detecting diode 64. In the embodiment shown in FIG. 1 reset circuit 16 also comprises resistors 80, 90, 92 and 98.

Discharge circuit 18 includes a flash capacitor 20 electrically connected to a flash tube 66. Flash tube 66 conducts electrical energy provided by flash capacitor 20 when a preferred potential exists at an electrode 68 on flash tube 66. Electrical energy is stored in flash capacitor 20 by voltage boosting circuit 12 in a manner that will be described in greater detail below.

Flash triggering circuit 22 comprises flash trigger transformer 70, a trigger capacitor 72, trigger capacitor charging resistor 74, and a flash sync switch 76. Flash triggering circuit 22 provides the preferred potential at electrode 68 in response to closure of flash sync switch 76 so that closure of flash sync switch 76 causes a flash of light to be discharged from flash tube 66 when flash capacitor 20 is appropriately charged.

The following sections will now describe the operation of the embodiment of FIG. 1. In the embodiment shown in FIG. 1, a charging cycle begins when the momentary contact switch 58 is closed. The closure of switch 58 creates a current that passes through a current limiting resistor 80 to create a voltage that forward biases latch transistor 56. This initiates a timing period during which timing capacitor 44 is charged. Latch transistor 54 and latch transistor 56 are connected to one another, collector to base, such that turning "on" one transistor of the pair will turn "on" the other and latch transistors 54 and 56 will keep each other forward biased as long as current is supplied to the emitter of latch transistor 54. This behavior is similar to a thyristor. In an alternative embodiment, a thyristor can be used in place of latch transistors 54 and 56.

Two sequential events take place after momentary contact switch 58 is momentarily closed. The first is that latch transistor 54 and latch transistor 56 turn "on". This allows timing capacitor 44 to charge to battery voltage minus the voltage drop of latch transistors 54 and 56. The second event begins when timing capacitor 44 is charged sufficiently to forward bias transistor 50, as control switch transistor 34 and oscillation transistor 32 turn "on", causing current to flow from battery 45 through primary winding 26 of step up transformer 24. Under this "second event" condition, an oscillation cycle will begin. At this point, all transistors 32, 34, 50, 54, and 56 are turned "on."

The following is a description of one oscillation cycle. Each oscillation cycle begins with current flowing through oscillation transistor 32 and primary winding 26 of step up transformer 24. The amount of current flowing in this way increases at a rate determined by the inductance of primary winding 26 and causes a corresponding increase in the magnetic flux in a core 25 of step up transformer 24. A corresponding current is induced in secondary winding 28 and feedback winding 30. The secondary voltage is stepped up to a high voltage and rectified by diode 40 to charge flash capacitor 20. When core 25 is saturated, current drops in the secondary winding 28 and feedback winding 30. A relatively low voltage positive flyback pulse is generated at the collector of oscillation transistor 32 as the flux in step-up transformer 26 collapses. This is the end of one oscillation cycle.

Negative voltage pulses are simultaneously generated at the emitter of control switch transistor 34 and at the base of oscillation transistor 32. A clamp diode 84 clamps these negative pulses, protecting both oscillation transistor 32 and control switch transistor 34 from damage due to excessive reverse bias. The use of a single diode, clamp diode 84, to protect both transistors is one factor that enables flash circuit 10 to provide protection for oscillation transistor 32 and control switch transistor 34 at a low cost.

The oscillator feedback used to drive the base of oscillation transistor 32 has two components. The first component is from transformer feedback winding 30. This signal is current limited by current limiting resistor 38 and its magnitude is relatively constant for the duration of the time required to charge flash capacitor 20. The second component of the oscillation feedback is the flash capacitor charging current from the negative terminal of flash capacitor 20. This current is high when charging begins on a discharged flash capacitor 20. This current then decreases exponentially as flash capacitor 20 charges. These two currents are added together at the emitter of control switch transistor 34.

By itself, first component of the oscillator feedback will sustain oscillations at a minimum battery current, will keep flash capacitor 20 at fill charge and will illuminate light emitting diode (LED) 42. However, both the first and second components are required to charge flash capacitor 20 to a requisite voltage to enable desirable flash discharge. This method of driving the base of oscillation transistor 32 has the advantage of using less energy from battery 45 after the flash capacitor 20 is charged, because oscillation is sustained only to maintain the flash capacitor 20 at flash ready voltage and to illuminate the LED 42.

The reverse voltage amplitude of the oscillation pulses on feedback winding 30 are proportional to the voltage on flash capacitor 20. The number of turns in feedback winding 30 is chosen so that the reverse oscillation pulse voltage will begin to illuminate LED 42 when flash capacitor 20 is charged to flash ready voltage. This flash ready voltage can be, for example, about 300 volts. Thus, LED 42 indicates to the photographer when flash circuit 10 is ready to take a flash picture.

During the first event (previously described), the emitter of latch transistor 54 and the collector of oscillation transistor 32 are at a voltage established by the voltage at battery 45. The second event is defined when a series of oscillations begins at oscillation transistor 32. Transistor 32 begins to oscillate when the magnetic field in core 25 of step up transformer 24 saturates and collapses inducing a periodic pulse signal known as a flyback signal in secondary winding 28 and feedback winding 30. The flyback signal is present during half of the oscillation cycle and takes the form of pulses at the collector of oscillation transistor 32 and at the emitter of latch transistor 54. During the other half of the oscillation cycle the collector of oscillation transistor 32 and the emitter of latch transistor 54 are at the saturation voltage of oscillation transistor 32. The saturation voltage is substantially less than the base-emitter voltage drop of transistor 32.

Latch transistors 54 and 56 are forward biased by the flyback pulses and transfer energy from the flyback pulses to charge timing capacitor 44. Transistors 54 and 56 turn off in between successive flyback pulses because the voltage at the emitter of transistor 54 (the saturation voltage of transistor 32) is less than the voltage on timing capacitor 44.

Timing capacitor 44 is eventually charged to the voltage of the flyback pulses minus the combined voltage drops of latch transistors 54 and 56. At this point the current through transistors 54 and 56 approaches zero and the transistors turn off, leaving timing capacitor 44 charged.

The time duration that latch transistors 54 and 56 conduct flyback pulses is a function of flyback pulse amplitude, frequency and harmonics which may be present on the flyback pulses. To reduce the influence of these factors, holding capacitor 60 and resistor 62 can be connected across the base-emitter of transistor 54. Holding capacitor 60 maintains transistors 54 and 56 "on" in-between flyback pulses.

As the collector current approaches zero, the current from holding capacitor 60 to the base of transistor 54 also drops, this current being supplied from the collector of transistor 56. When capacitor 60 is discharged, latch transistors 54 and 56 turn off, leaving timing capacitor 44 charged. Resistor 62 controls the discharge rate of holding capacitor 60. This establishes the time that transistors 54 and 56 are held "on". This improves the repeatability of the charging time of timing capacitor 44, which is otherwise dependent on flyback pulse amplitude (which is a function of battery energy level), frequency and harmonics present on the flyback pulses.

Resistors 90 and 92 insure that transistors 54 and 56 will stay off in the absence of forward bias. Resistor 100 insures that control switch transistor 34 will stay off in the absence of forward bias. Resistor 102 limits the current to the base of control switch transistor 34. Resistor 48 provides a slow discharge path for timing capacitor 44 and resistor 46 provides a trickle bias for timing transistor 50, which stays "on" until the charge on timing capacitor 44 falls below the forward base to emitter bias of timing transistor 50. When this occurs, transistor 50 turns "off", which in turn turns "off" control switch transistor 34 and oscillation transistor 32. This ends the timing period. As transistors 54 and 56 have previously turned off, all of transistors 32, 34, 50, 54, and 56 are "off".

Typically batteries of the type used as battery 45 in a flash circuit 10 are less efficient at low temperature. Therefore the amount of time that is required to charge flash capacitor 20 will be longer at low temperature. It may therefore be desirable to provide features in flash circuit 10 that automatically provide a longer timing period when flash circuit 10 is operated in low temperature environments. Accordingly, in one embodiment of the present invention, resistor 48 is a temperature dependent resistor, such as a thermistor or other temperature dependent variable resistor. This embodiment of resistor 48 is selected so that the resistance provided by resistor 48 increases as ambient temperature decreases. This, in turn provides a longer timing period when this embodiment of flash charging circuit 10 is operated at a low temperature and a shorter timing period at normal temperatures.

Switch 76 comprises shutter sync contacts 94 and 96, which close when a shutter (not shown) in a camera (not shown) that uses flash circuit 10 opens to expose a film (not shown) in the camera. When this occurs, trigger capacitor 72 is charged to the flash capacitor voltage through resistor 74. When sync switch 76 closes, trigger capacitor 72 discharges into the primary winding of trigger transformer 70, generating a very high voltage pulse at a secondary winding of trigger transformer 70, which is applied to contact 68 and which provides sufficient potential to initiate conduction in flash tube 66. Flash capacitor 20 then discharges through flash tube 66, which emits light. The timing period comprises both the charging and discharging of timing capacitor 44.

The timing period is automatically restarted when sync switch 76 is closed. Diode 64 is normally reverse biased by the high voltage charge on capacitor 20. The minimum voltage on flash capacitor 20 will be the voltage at battery 45 minus the forward voltage drop of rectifier diode 40. This minimum voltage is sufficient to reverse bias flash sync detecting diode 64.

When sync switch 26 closes, flash sync detecting diode 64 is forward biased and current flows through a current limiting resistor 98 to turn "on" latch transistor 54. This begins the automatic timing period reset after flash by initiating the first sequential event described above. However, it will be appreciated that the closure time of sync switch 76 is about 0.1 millisecond, which is much shorter than a closure time that can be provided by a person pressing momentary switch 58 to initiate charging. The closure time of sync switch 76 is also shorter than the time required for flyback pulses to appear at the emitter of latch transistor 54 and is thus shorter than the time required to complete the first sequential event. This problem is solved in reset circuit 16 by transistors 54 and 56, which are kept "on" by the bias from holding capacitor 60 which is charged during the conduction of flash sync detecting diode 64, thus insuring completion of the first sequential event.

Figure 2:
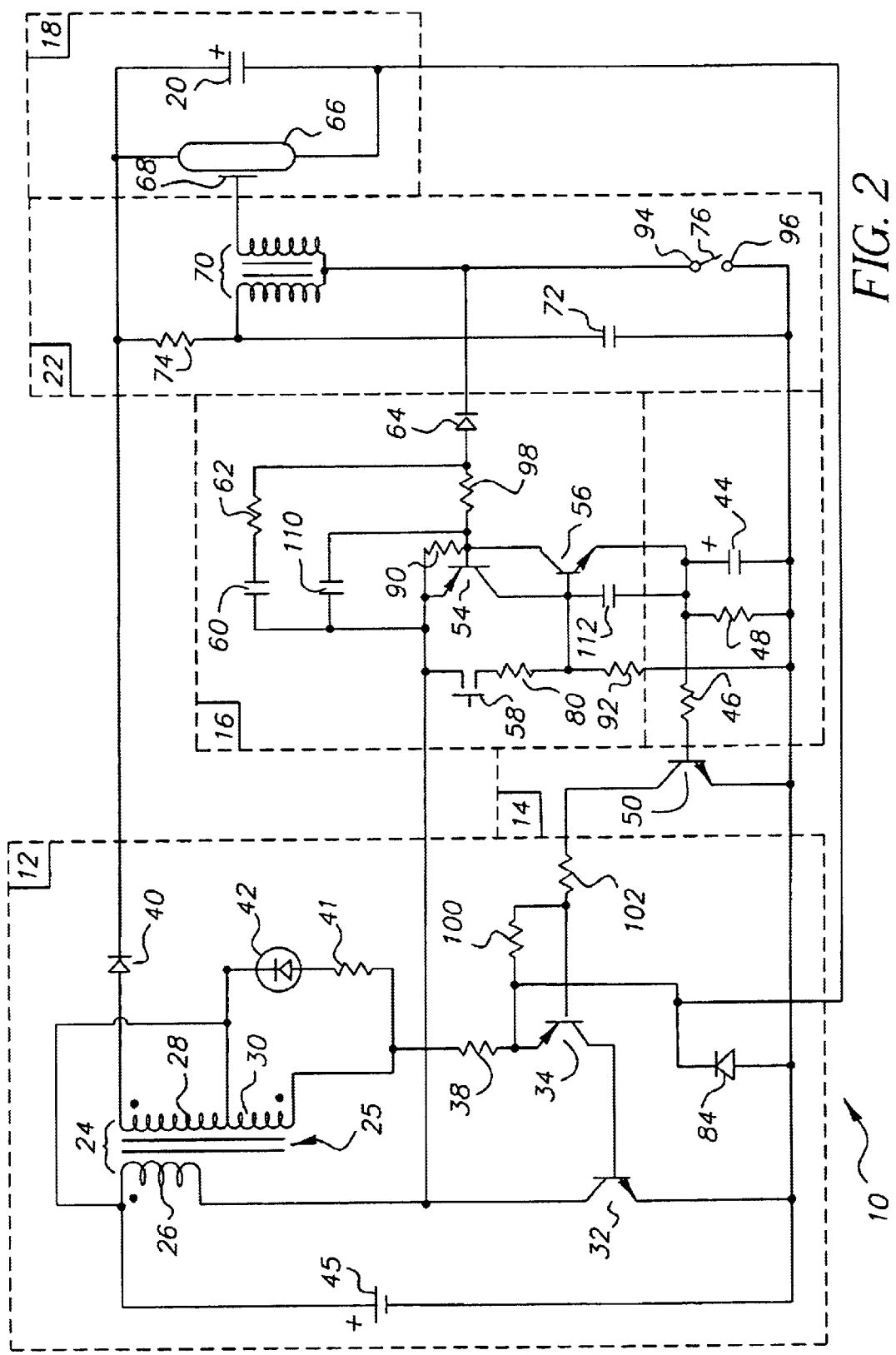
FIG. 2 shows another embodiment of a flash circuit in accordance with of the present invention.

FIG. 2 shows another embodiment of flash circuit 10 of FIG. 1. In this embodiment flash circuit 10 has a filtering capacitor 110 connected across the base-emitter of latch transistor 54 and a filtering capacitor 112 across the base-emitter of latch transistor 56. Small amplitude impulse noise or static electricity can trigger these transistors "on" and initiate an undesired timing period. Filtering capacitors 110 and 112 reduce the sensitivity of flash circuit 10 to impulse noise without substantially increasing the cost of this embodiment of flash circuit 10.

Figure 3:
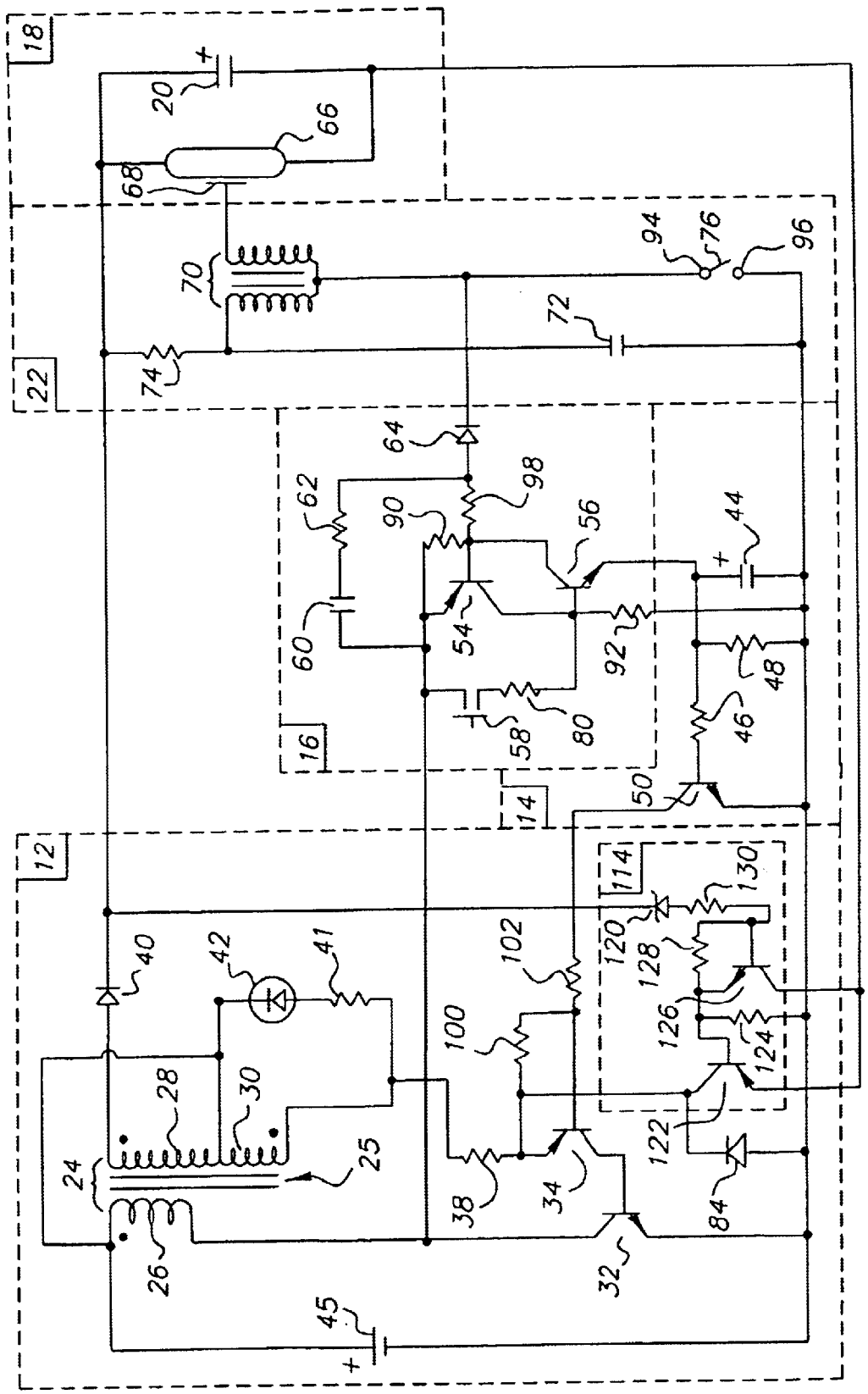
FIG. 3 shows still another embodiment of a flash circuit in accordance with present invention.

FIG. 3 shows another embodiment of a flash circuit 10. In the embodiment of FIG. 3 a charge limiting circuit 114 is added to the embodiment shown in FIG. 1 to further improve the battery efficiency of flash circuit 10. As described above, in flash circuit 10 the oscillator feedback signal to the base of oscillation transistor 32 has two components. The first component is from transformer feedback winding 30. The second component is the flash capacitor charging current from the negative terminal of flash capacitor 20. These two currents are added together through the emitter of control switch transistor 34. The first component alone will sustain oscillations after flash capacitor 20 is charged but both current components are necessary to drive oscillation transistor 34 sufficiently to charge flash capacitor 20.

In the embodiment of FIG. 3, additional battery energy savings are obtained by electronically disconnecting the flash capacitor 20 from charging circuit 12 after flash capacitor 20 reaches a voltage determined by a zener diode 120 which can establish a voltage limit of, for example, 320 volts. This is done by disconnecting the second current component from the emitter of oscillation transistor 32 and allowing the first current component to sustain oscillations, at minimum battery current, for the duration of the timing period. This prevents the charger from using battery energy to charge flash capacitor 20 to a voltage higher than necessary. Even though flash capacitor 20 charging is terminated, ready light LED 42 is illuminated for the duration of the timing period.

While flash capacitor 20 is charging, transistor 122 is biased "on" by resistor 124 and transistor 126 is not conducting. Transistor 122 thus conducts the charging current from a negative terminal of flash capacitor 20 to the emitter of control switch transistor 34, providing normal flash capacitor charging. Zener diode 120 conducts at flash ready voltage and forward biases transistor 126, which is normally biased "off" by resistor 128. Resistor 130 limits the current to the base of transistor 126. When transistor 126 turns "on" it biases transistor 122 "off", which effectively disconnects the negative terminal of flash capacitor 20 from the emitter of control switch transistor 34. The oscillation of oscillation transistor 32 is sustained only by current from feedback winding 30 and ready light LED 42 is illuminated. The battery current is minimum because flash capacitor 20 is not being charged.

As the flash capacitor discharges, zener diode 120 will cease conduction and transistors 122 and 124 will reconnect flash capacitor 20, which will recharge to the zener voltage. This cycle will repeat until the timing period ends, maintaining the flash capacitor at the zener voltage while conserving battery energy. Therefore the embodiment of FIG. 3 always charges flash capacitor 20 to the same voltage, a voltage established by zener diode 120, with either a strong or weak battery.

Figure 4:
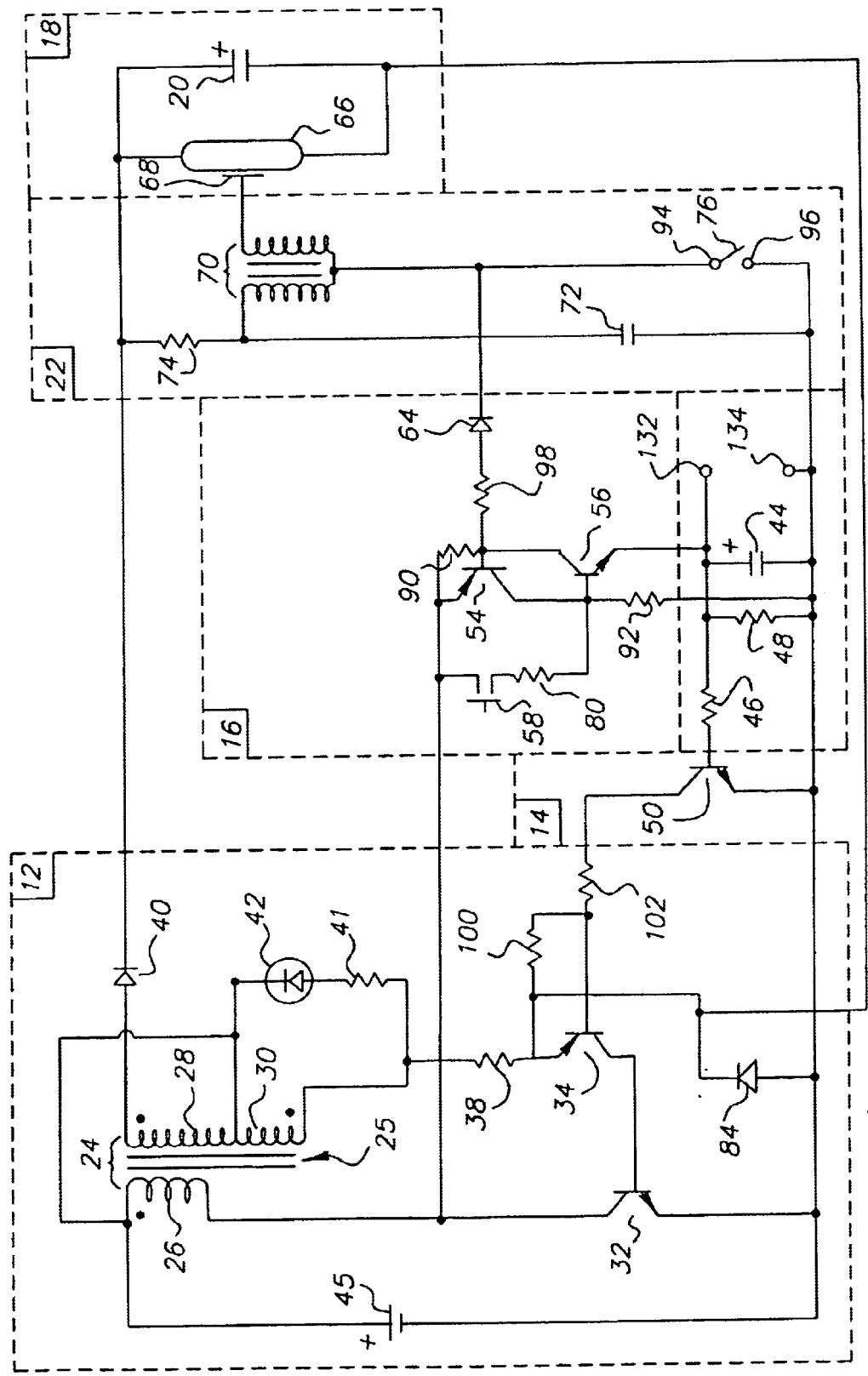
FIG. 4 shows still another embodiment of a flash circuit in accordance with present invention.

FIG. 4 shows still another alternative embodiment of the circuit of FIG. 1. In this embodiment holding capacitor 60 and series resistor 62 are omitted. In this configuration transistors 54 and 56 operate to recharge the timing capacitor 44 and thus reset the timing period. Transistors 54 and 56 both turn "on" for each flyback pulse and turn "off" when each flyback pulse terminates. Latch transistors 54 and 56 cease turning "on" when timing capacitor 44 charges to the amplitude of the flyback pulses because of the diminished voltage drop across latch transistors 54 and 56. This ends the reset period for timing capacitor 44 and timing capacitor 44 will begin discharging.

As is also shown in FIG. 4, optional test points 132 and 134 are provided across timing capacitor 44 so that a testing circuit from a testing circuit (not shown) can determine conditions at the timing capacitor. Depending on the testing regimen applied, the testing circuit (not shown) can determine the condition at the timing capacitor by measuring the voltage on timing capacitor 44, also the testing circuit can modify the state of timing capacitor 44 by changing the time constant associated with timing capacitor 44 or by shorting the timing capacitor 44 to prematurely terminate the timing period. Also the testing circuit (not shown) can force timing capacitor 44 to a predetermined voltage to quickly move the timing period to a certain state.

The invention has been described in detail with particular reference to certain preferred embodiments thereof, but it will be understood that variations and modifications can be effected within the spirit and scope of the invention.

Parts List 10 flash circuit
12 voltage boosting circuit
14 timer circuit
16 reset circuit
18 flash discharge circuit
20 flash capacitor
22 flash triggering circuit
24 step up transformer
25 core of step up transformer
26 primary winding
28 secondary winding
30 feedback winding
32 oscillation transistor
34 control switch transistor
38 limiting resistor
40 voltage rectifier diode
41 resistor
42 light emitting diode
44 timing capacitor
46 current limiting resistor
45 battery
48 time constant resistor
50 timing transistor
54 latch transistor
56 latch transistor
58 momentary contact switch
60 holding capacitor
62 series resistor
64 flash sync detecting diode
66 flash tube
70 flash trigger transformer
72 trigger capacitor
74 trigger capacitor charging resistor
76 flash sync switch
80 current limiting resistor
84 clamp diode
90 resistor
92 resistor
94 flash sync switch contact
96 flash sync switch contact
98 current limiting resistor
100 resistor
102 resistor
110 filtering capacitor
112 filtering capacitor
114 charge limiting circuit
120 zener diode
122 transistor
124 resistor
126 transistor
128 resistor
130 current limiting resistor
132 test point
134 test point

What is claimed is:

1. A flash circuit for use in a camera, the flash charging circuit comprising:
   a flash light discharge circuit having a light emitting element electrically connected to a flash capacitor;
   a flash triggering circuit connected to the flash light discharge circuit with the flash triggering circuit having a trigger signal generating circuit generating a signal that enables energy from the flash capacitor to be converted into light by the light emitting element;
   a voltage conversion circuit connected between a battery and the flash capacitor to convert energy from a source voltage into a higher voltage to charge the flash capacitor;
   a timer circuit to cause the voltage conversion circuit to operate when the voltage at a timing capacitor is within a range of voltages, said timer circuit incorporating said timing capacitor in a time constant circuit that discharges energy stored in the timing capacitor at a predetermined rate; and
   a reset circuit that resets the timing capacitor voltage to a voltage that is within the range, the reset circuit being actuated by said flash triggering circuit;
   wherein the range of voltages is higher than the battery voltage and wherein the reset circuit first applies battery voltage to the timing capacitor and then applies voltage generated by the voltage conversion circuit to the timing capacitor to charge the timing capacitor to a voltage that is higher than the battery voltage.

2. The flash circuit of claim 1 where the reset circuit comprises a pair of complementary transistors, connected so as to latch each other in an "on" state, and arranged so that when latched in an "on" state, the transistors permit the voltage conversion circuit to charge the timing capacitor.

3. The flash circuit of claim 2, wherein the flash charging circuit comprises an oscillating transistor, and a charging terminal of a timing capacitor, and wherein the reset circuit is connected between a collector of the oscillation transistor and the charging terminal of the timing capacitor.

4. The flash circuit of claim 2, wherein the voltage conversion circuit generates a pulse train to charge the timing capacitor, and wherein when the timing capacitor is fully charged, the complementary transistors are electrically connected between the voltage conversion circuit and the timing capacitor so that the complementary transistors are transitioned to an "off" state as a voltage drop across the complementary transistors approaches zero when the timing capacitor reaches a fully charged condition.

5. The flash circuit of claim 4 wherein the complementary transistors are latched in an "on" state by a holding circuit comprising a resistor and a capacitor, said holding circuit being electrically connected to the base of one of said complementary transistors so that the holding circuit is charged when the sync switch is momentarily closed, said holding circuit keeping said complementary transistors latched to charge timing capacitor for a period of time determined by said holding circuit.

6. The flash circuit of claim 5 wherein said holding circuit is connected to the base of one of the complementary transistors and one of the complementary transistors is triggered by closure of said sync switch and the other transistor is triggered by closure of a switch operated by the customer.

7. The flash circuit of claim 6, wherein the period of time that said holding circuit operates the flash charging circuit is substantially shorter than the period of time that the customer operated switch will generate a reset signal.

8. The flash circuit of claim 1, wherein the amount of time required to charge the flash capacitor is a function of ambient temperature and wherein the discharge rate of the timing capacitor is prolonged at low ambient temperatures so that when battery efficiency is reduced because of low ambient temperature the amount of time of charging is extended.

9. The circuit of claim 8 wherein a temperature dependent resistor is associated with said timing capacitor to extend the timing period.

10. A flash charging circuit for use in a camera, the flash charging circuit comprising:
    a flash light discharge circuit comprising a light emitting element electrically connected to a flash capacitor;
    a flash triggering circuit connected to the flash light discharge circuit with the flash triggering circuit having a trigger signal generating circuit generating a signal that enables energy from the flash capacitor to be converted into light by the light emitting element;
    a voltage conversion circuit connected between a battery and the flash capacitor to convert energy from a battery voltage into a higher voltage to charge the flash capacitor;
    a timer circuit to cause the voltage conversion circuit to operate when the voltage at a timing capacitor is within a range of voltages, said timer circuit incorporating said timing capacitor in a time constant circuit that discharges energy stored in the timing capacitor at a predetermined rate; and
    a reset circuit having a latched pair of transistors connected to the timing capacitor, a gate of said latched pair of transistors being triggered upon operation of a shutter of the camera, with the latched pair of transistors being connected to the battery and conducting energy from the battery to the timing capacitor when the latched pair of transistors is triggered to charge the timing capacitor to a voltage no greater than the battery voltage but within the range of voltages;
    wherein said voltage conversion circuit further supplies voltage pulses to the latched pair of transistors to charge the timing capacitor to a voltage higher than the battery voltage when the voltage conversion circuit is operated and wherein the latched pair of transistors turns off when the voltage at the timing capacitor approaches the voltage of said pulses.

11. The flash circuit of claim 10 further comprising a detecting circuit which detects the voltage to which the flash capacitor is charged; said detecting circuit disables further flash capacitor charging after a flash ready voltage is reached but allows the oscillator to operate to enable continuous illumination of an LED ready light.

12. The flash circuit of claim 10 wherein the detecting circuit has:
    a switch transistor connected in series with the flash capacitor to disable the flash capacitor from being charged when the signal from the detector indicates that the voltage at the flash capacitor has reached a desired voltage;
    a voltage detector generating a signal that indicates a voltage to which the flash capacitor is charged.

13. The flash circuit of claim 10 further comprising a means to sustain oscillations and illuminate a LED ready light after the flash capacitor charging is disabled.

14. The flash circuit of claim 10 wherein the detector comprises a zener diode.

15. The flash circuit of claim 10 further comprising a pair of filter capacitors electrically connected between the base and emitter of each latch transistor.

16. The flash circuit of claim 10 further comprising a biasing capacitor and series resistor providing a biasing voltage to said latched pair of transistors.

17. A photographic flash circuit comprising:

a light emitting element connected to a flash capacitor;

a flash triggering circuit which causes the light emitting element to convert energy from the flash capacitor into light;

a voltage conversion circuit for converting a low battery voltage into a higher voltage to charge said flash capacitor, with the voltage conversion circuit having an oscillation transistor and at least one other transistor in an oscillation current path, said oscillation transistor oscillating during voltage conversion; and a diode connected to more than one transistor to suppress any voltage spikes that appear during oscillation at the transistors to which the diode is connected.

18. A photographic flash charging circuit comprising:

a light emitting element connected to a flash capacitor;

a flash triggering circuit which causes the light emitting element to convert energy from the energy storage capacitor into light; and a timer control circuit adapted to cause the voltage conversion circuit to operate for a timing period and then automatically shut off, with the timer control being reset to the beginning of the timing period by actuation of the flash triggering circuit, with the timing circuit having a timing period determined as a function of the voltage to which a timing capacitor is charged when the timing circuit is reset and said timer control circuit further comprising test points provided across the timing capacitor so that conditions at the timing capacitor can be determined using the test points to enable testing of the circuit.

19. The flash circuit of claim 18 wherein the test points are adapted for use in determining conditions at the timing capacitor by, at least one of, sensing for conditions indicating that the reset has taken place, sensing for conditions indicating whether the timing period has terminated, applying a short across the timing capacitor, charging the timing capacitor, and causing the timing capacitor to discharge at a fast rate.

* * * * *